(12) United States Patent
Wang et al.

(10) Patent No.: US 12,745,252 B2
(45) Date of Patent: Sep. 22, 2026

(54) CARRIER DETERMINATION AND INDICATION METHOD, DEVICE, APPARATUS, MEDIUM

(71) Applicant: DATANG MOBILE COMMUNICATIONS EQUIPMENT CO., LTD., Beijing (CN)

(72) Inventors: Lei Wang, Beijing (CN); Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 757 days.

(21) Appl. No.: 17/919,236

(22) PCT Filed: Apr. 12, 2021

(86) PCT No.: PCT/CN2021/086612
§ 371 (c)(1),
(2) Date: Oct. 14, 2022

(87) PCT Pub. No.: WO2021/208853
PCT Pub. Date: Oct. 21, 2021

(65) Prior Publication Data

US 2023/0156725 A1 May 18, 2023

(30) Foreign Application Priority Data

Apr. 15, 2020 (CN) ......................... 202010293799.3

(51) Int. Cl.
*H04W 72/23* (2023.01)
*H04W 72/1273* (2023.01)

(52) U.S. Cl.
CPC ....... *H04W 72/23* (2023.01); *H04W 72/1273* (2013.01)

(58) Field of Classification Search
CPC ..... H04L 5/0094; H04L 5/0098; H04L 5/001; H04L 5/0053; H04W 72/23;
(Continued)

(56) References Cited

U.S. PATENT DOCUMENTS 8,861,500 B2 * 10/2014 Dai ....................... H04L 5/0096 370/345
2011/0273992 A1 * 11/2011 Zhang ..................... H04L 5/001 370/280
(Continued)

FOREIGN PATENT DOCUMENTS

CN 102201885 A 9/2011
CN 106714320 A 5/2017
(Continued)

OTHER PUBLICATIONS

"A Novel Cross-Carrier Scheduling Method in Carrier Aggregation"; Zeng et al.; 2013 International Conference on Computational Problem-Solving (ICCP); Sep. 2014 (Year: 2014).*
(Continued)

*Primary Examiner* — Benjamin H Elliott, IV
(74) *Attorney, Agent, or Firm* — Ladas & Parry, LLP

(57) ABSTRACT

The present disclosure discloses a carrier determination and indication method, a device, an apparatus, and a medium. The carrier determination and indication method include that the base station determines N carriers to be scheduled, wherein N is a positive integer greater than or equal to 2; and the base station indicates the terminal the N carriers scheduled on a downlink control information; and the terminal receives downlink control information and determines N carriers scheduled by a base station through the downlink control information.

17 Claims, 2 Drawing Sheets receiving a DCI by a terminal, wherein N CCs are scheduled by the DCI, N is a positive integer greater than or equal to 2 — 101 determining, by the terminal, N CCs scheduled by a base station through the DCI — 102

(58) Field of Classification Search
CPC ........... H04W 72/1273; H04W 72/232; H04W 72/0453; H04W 72/12
See application file for complete search history.

(56) References Cited

U.S. PATENT DOCUMENTS

| | | | | |
|---|---|---|---|---|
| 2012/0063324 | A1* | 3/2012 | Kim | H04L 5/0053 370/241 |
| 2012/0140727 | A1* | 6/2012 | Ng | H04L 5/0053 370/329 |
| 2012/0320840 | A1* | 12/2012 | Kim | H04L 5/0094 370/329 |
| 2012/0327917 | A1* | 12/2012 | Yang | H04L 69/324 370/336 |
| 2013/0094456 | A1* | 4/2013 | Ng | H04W 88/06 370/328 |
| 2013/0107835 | A1* | 5/2013 | Aiba | H04L 5/001 370/329 |
| 2015/0333889 | A1* | 11/2015 | Earnshaw | H04L 5/0053 370/329 |
| 2016/0007373 | A1* | 1/2016 | Davydov | H04L 27/0006 370/329 |
| 2016/0100382 | A1* | 4/2016 | He | H04L 5/001 370/329 |
| 2016/0183293 | A1* | 6/2016 | Lei | H04W 24/02 370/329 |
| 2016/0223727 | A1* | 8/2016 | Sugiyama | G02B 5/0816 |
| 2016/0227541 | A1* | 8/2016 | Damnjanovic | H04W 72/23 |
| 2016/0242153 | A1* | 8/2016 | Chen | H04L 5/0098 |
| 2016/0254888 | A1* | 9/2016 | Nagata | H04L 5/0053 370/329 |
| 2017/0135127 | A1* | 5/2017 | Nogami | H04W 72/23 |
| 2017/0338918 | A1* | 11/2017 | Tang | H04L 1/18 |
| 2018/0115965 | A1* | 4/2018 | Takeda | H04L 5/0037 |
| 2018/0152954 | A1* | 5/2018 | Golitschek Edler Von Elbwart | H04L 5/0092 |
| 2018/0295608 | A1* | 10/2018 | Nguyen | H04W 72/23 |
| 2018/0338301 | A1* | 11/2018 | Gao | H04L 1/1896 |
| 2020/0145968 | A1* | 5/2020 | Yang | H04L 1/0046 |
| 2020/0169990 | A1* | 5/2020 | Takeda | H04J 1/00 |
| 2020/0275421 | A1* | 8/2020 | Yang | H04L 5/0053 |
| 2021/0014846 | A1* | 1/2021 | Zeng | H04W 72/20 |
| 2021/0029703 | A1* | 1/2021 | Zhou | H04L 5/0053 |
| 2021/0037551 | A1* | 2/2021 | Khoshnevisan | H04L 5/0044 |
| 2021/0136798 | A1* | 5/2021 | Ang | H04W 72/0446 |
| 2021/0360679 | A1* | 11/2021 | Khoshnevisan | H04L 1/0069 |
| 2023/0022908 | A1* | 1/2023 | Yuan | H04L 5/0091 |
| 2023/0036466 | A1* | 2/2023 | Yoshioka | H04L 5/001 |
| 2023/0090006 | A1* | 3/2023 | Yang | H04L 1/1671 370/329 |
| 2023/0144002 | A1* | 5/2023 | Kim | H04L 5/001 370/329 |
| 2023/0156725 | A1* | 5/2023 | Wang | H04W 72/232 370/329 |

FOREIGN PATENT DOCUMENTS

| | | | |
|---|---|---|---|
| CN | 107113836 | A | 8/2017 |
| CN | 110149183 | A | 8/2019 |
| WO | 2016003614 | A1 | 1/2016 |
| WO | 2016053450 | A1 | 4/2016 |
| WO | 2016130960 | A1 | 8/2016 |
| WO | 2016189766 | A1 | 12/2016 |
| WO | 2017079560 | A1 | 5/2017 |
| WO | 2021206422 | A1 | 10/2021 |

OTHER PUBLICATIONS

"A Study on Cross-Carrier Scheduler for Carrier Aggregation in Beyond 5G Networks"; Nidhi et al.; 3rd URSI AT-AP-RASC, Gran Canaria, May 29-Jun. 3, 2022 (Year: 2022).*

International Search Report for PCT/CN2021/086612 issued on Jul. 2, 2021 and its English Translation provided by WIPO.

Written Opinion for PCT/CN2021/086612 issued on Jul. 2, 2021 and its English Translation provided by WIPO.

International Report on Patentibily for PCT/CN2021/086612 issued on Oct. 13, 2022 and its English translation provided by WIPO.

International Search Report for PCT/CN2021/086617 issued on Jul. 2, 2021 and its English Translation provided by NIPO.

Written Opinion for PCT/CN2021/086617 issued on Jul. 2, 2021 and its English Translation provided by WIPO.

International Report on Patentibily for PCT/CN2021/086617 issued on Oct. 13, 2022 and its English translation provided by WIPO.

First Taiwanese Office Action for Taiwanese Patent Application No. 110113034 issued on December 7, 20222, and its English translation provided by foreign associate.

First Office Action and search report for the corresponding Chinese Patent Application No. 202010293799.3 issued by the Chinese Patent Office on Jul. 26, 2023, and its English Translation provided by the foreign associate.

Extended European Search Report for the corresponding European Patent Application No. 21788950.0 issued by the European Patent Office on Aug. 7, 2023.

"Other issues on NR CA and DC including SRS switching and SUL," 3GPP TSG RAN WG1 Meeting #90bis, R1-1717080, Prague, Czech Republic, Oct. 9-13, 2017, Agenda Item: 7.3.4.2, Source: Huawei, HiSilicon, all pages.

"Considerations on PDCCH-based power saving signal," 3GPP TSG-RAN Wg1 #97, R1-1906819, Reno, USA, May 13-17, 2019, Source: Intel Corporation, Agenda Item: 7.2.9.1, all pages.

* cited by examiner

CARRIER DETERMINATION AND INDICATION METHOD, DEVICE, APPARATUS, MEDIUM

CROSS-REFERENCE TO RELATED APPLICATIONS

This application is the U.S. national phase of PCT Application No. PCT/CN2021/086612 filed on Apr. 12, 2021, which claims priority to Chinese Patent Application No. 202010293799.3 filed in China on Apr. 15, 2020, the disclosures of which are incorporated in their entireties by reference herein.

TECHNICAL FIELD

The present disclosure relates to the field of wireless communication technology, in particular to a carrier determination and indication method, a device, an apparatus and a medium.

BACKGROUND

In the current wireless communication system, if the base station is configured with cross-carrier scheduling, the terminal only detects and receives the corresponding downlink control channel on the scheduling carrier, and uses the CIF (Carrier Indicator Field) included in the DCI (Downlink Control Information) to determine the target carrier scheduled by the received DCI. Data on different scheduling carriers is scheduled through different DCI.

The disadvantage of the related art is that in the current system, a single DCI can only schedule data transmission on one carrier, and cannot schedule data transmission on multiple carriers through a single DCI.

SUMMARY

An The present disclosure provides a carrier determination and indication method, a device, an apparatus, and a medium to solve the problem that data transmission on multiple carriers cannot be scheduled through a single DCI.

An embodiment of the present disclosure provides a carrier determination method, including:

receiving a DCI by a terminal, wherein N CCs are scheduled by the DCI, N is a positive integer greater than or equal to 2;

determining, by the terminal, N CCs scheduled by a base station through the DCI.

In the implementation, the terminal determines the N CCs scheduled by the base station through the DCI in one of the following ways or a combination thereof:

determining the N CCs scheduled by the DCI according to a CIF field in the DCI; or, determining the N CCs scheduled by the DCI according to a bit field in the DCI used for indicating the N CCs scheduled by the DCI; or, determining the N CCs scheduled by the DCI according to an indication of higher layer signaling.

In the implementation, when determining the N CCs scheduled by the DCI according to the CIF field in the DCI, the CIF field includes information used for indicating N CCs including a scheduling carrier; or the CIF field includes information used for indicating a combination of N CCs other than the scheduling carrier, wherein the scheduling carrier is a carrier that transmits the DCI.

In the implementation, when the CIF field includes the information used for indicating the N CCs including the scheduling carrier, the N CCs scheduled by the base station are determined in one of the following ways or a combination thereof:

one of multiple carrier groups is indicated in the CIF field, wherein the multiple carrier groups are pre-configured through higher layer signaling, and each carrier group includes the scheduling carrier; or, when N=2, the CIF is used for indicating a scheduled carrier other than the scheduling carrier; or, the CIF indicates a starting carrier number of the N carriers scheduled by the DCI, and N consecutive CCs starting from the starting carrier number.

In the implementation, the method further includes:

indicating, when the CIF field indicates the scheduling carrier, that the DCI does not support simultaneous scheduling of multiple CCs.

In the implementation, before determining, by the terminal, the N CCs scheduled by a base station through the DCI, the method further includes:

determining, when the DCI coincides with a physical downlink control channel (PDCCH) candidate of other DCI on the scheduling carrier, and a DCI format is the same, that the DCI transmitted on the PDCCH candidate is the DCI for scheduling the N CCs.

In the implementation, when the CIF field includes information used for indicating a combination of N CCs other than the scheduling carrier, the N CCs scheduled by the base station are determined in one of the following ways or a combination thereof:

one of multiple carrier groups is indicated in the CIF field, wherein the multiple carrier groups are pre-configured through higher layer signaling, and each carrier group does not include a scheduling carrier; or, the CIF indicates a starting carrier number of the N carriers scheduled by the DCI, and N consecutive CCs starting from the starting carrier number.

In the implementation, when the CIF indicates the starting carrier number of the N carriers scheduled by the DCI and the N consecutive CCs starting from the starting carrier number, N is indicated in one of the following ways or a combination thereof:

N is configured through higher layer signaling; or,

N is determined in a way predefined by a protocol; or,

N is indicated by a newly introduced first information field in the DCI.

In the implementation, when the CIF indicates the starting carrier number of the N carriers scheduled by the DCI and the N consecutive CCs starting from the starting carrier number, the method further includes:

newly introducing a second information field, the second information field being used for indicating whether the DCI is used for multi-carrier scheduling.

In the implementation, when determining the N CCs scheduled by the DCI according to the bit field in the DCI used for indicating the N CCs scheduled by the DCI, N is configured through higher layer signaling.

In the implementation, when determining the N CCs scheduled by the DCI according to the bit field in the DCI used for indicating the N CCs scheduled by the DCI, if the CIF field indicates a scheduling carrier, it indicates that the DCI does not support simultaneous scheduling of multiple CCs, wherein the scheduling carrier is a carrier that transmits the DCI.

In the implementation, when determining the N CCs scheduled by the DCI according to the indication of higher layer signaling, before determining, by the terminal, the N CCs scheduled by the base station through the DCI, the method further includes:

determining, by the terminal, that the DCI configured by higher layer configuration per search space or per CORESET is the DCI for scheduling N CCs.

In the implementation, the method further includes:

updating a combination of the N CCs according to medium access control control element (MAC CE).

An embodiment of the present disclosure provides a carrier indication method, including:

determining, by a base station, N CCs to be scheduled, wherein N is a positive integer greater than or equal to 2;

indicating, by the base station, the N CCs scheduled by the terminal on a DCI.

In the implementation, the base station indicates the terminal the N CCs scheduled by the base station through the DCI in one of the following ways or a combination thereof:

indicating the N CCs scheduled by the DCI through a CIF field in the DCI; or, indicating the N CCs scheduled by the DCI through a bit field in the DCI used for indicating the N CCs scheduled by the DCI; or, indicating the N CCs scheduled by the DCI through higher layer signaling.

In the implementation, when indicating the N CCs scheduled by the DCI through a CIF field in the DCI, the CIF field includes information used for indicating N CCs including a scheduling carrier; or the CIF field includes information used for indicating a combination of N CCs other than the scheduling carrier, wherein the scheduling carrier is a carrier that transmits the DCI.

In the implementation, when the CIF field includes information used for indicating the N CCs including the scheduling carrier, the N CCs scheduled by the base station are indicated in one of the following ways or a combination thereof:

one of multiple carrier groups is indicated in the CIF field, wherein the multiple carrier groups are pre-configured through higher layer signaling, and each carrier group comprises the scheduling carrier; or, when N=2, the CIF is used for indicating a scheduled carrier other than the scheduling carrier; or, the CIF indicates a starting carrier number of the N carriers scheduled by the DCI, and N consecutive CCs starting from the starting carrier number.

In the implementation, the method further includes:

indicating, when the CIF field indicates the scheduling carrier, that the DCI does not support simultaneous scheduling of multiple CCs.

In the implementation, the method further includes:

configuring that the DCI coincides with a physical downlink control channel (PDCCH) candidate of other DCI on the scheduling carrier, and a DCI format is the same, to indicate that the DCI transmitted on the PDCCH candidate is the DCI for scheduling the N CCs.

In the implementation, when the CIF field includes information used for indicating a combination of N CCs other than the scheduling carrier, the N CCs scheduled by the base station are indicated in one of the following ways or a combination thereof:

one of multiple carrier groups is indicated in the CIF field, wherein the multiple carrier groups are pre-configured through higher layer signaling, and each carrier group does not include a scheduling carrier; or, the CIF indicates a starting carrier number of the N carriers scheduled by the DCI, and N consecutive CCs starting from the starting carrier number.

In the implementation, when the CIF indicates the starting carrier number of the N carriers scheduled by the DCI, and N consecutive CCs starting from the starting carrier number, N is indicated in one of the following ways or a combination thereof:

N is configured through higher layer signaling; or,

N is determined in a way predefined by a protocol; or,

N is indicated by a newly introduced first information field in the DCI.

In the implementation, when the CIF indicates the starting carrier number of the N carriers scheduled by the DCI, and N consecutive CCs starting from the starting carrier number, the method further includes:

newly introducing a second information field, the second information field being used for indicating whether the DCI is used for multi-carrier scheduling.

In the implementation, when indicating the N CCs scheduled by the DCI according to a bit field in the DCI used for indicating the N CCs scheduled by the DCI, N is configured through higher layer signaling.

In the implementation, when indicating the N CCs scheduled by the DCI according to a bit field in the DCI used for indicating the N CCs scheduled by the DCI, the CIF field is configured to indicate the scheduling carrier, in order to indicates that the DCI does not support simultaneous scheduling of multiple CCs, wherein the scheduling carrier is a carrier that transmits the DCI.

In the implementation, when indicating the N CCs scheduled by the DCI through higher layer signaling, the higher layer configuration is configured per search space or per CORESET to indicate that the DCI is the DCI for scheduling N CCs.

In the implementation, the method further includes:

updating a combination of the N CCs through MAC CE.

An embodiment of the present provides a user terminal, including:

a processor, configured to read a program in a memory, and execute the following processes:

receiving DCI, wherein N CCs are scheduled by the DCI, N is a positive integer greater than or equal to 2;

determining N CCs scheduled by a base station through the DCI.

a transceiver, configured to receive and transmit data under the control of the processor.

In the implementation, the N CCs scheduled by the base station are determined through DCI in one of the following ways or a combination thereof:

determining the N CCs scheduled by the DCI according to a CIF field in the DCI; or, determining the N CCs scheduled by the DCI according to a bit field in the DCI used for indicating the N CCs scheduled by the DCI; or, determining the N CCs scheduled by the DCI according to an indication of higher layer signaling.

In the implementation, when determining the N CCs scheduled by the DCI according to the CIF field in the DCI, the CIF field includes information used for indicating N CCs including a scheduling carrier; or the CIF field includes information used for indicating a combination of N CCs other than the scheduling carrier, wherein the scheduling carrier is a carrier that transmits the DCI.

In the implementation, when the CIF field includes the information used for indicating the N CCs including the scheduling carrier, the N CCs scheduled by the base station are determined in one of the following ways or a combination thereof:

one of multiple carrier groups is indicated in the CIF field, wherein the multiple carrier groups are pre-configured through higher layer signaling, and each carrier group comprises the scheduling carrier; or, when N=2, the CIF is used for indicating a scheduled carrier other than the scheduling carrier; or, the CIF indicates a starting carrier number of the N carriers scheduled by the DCI, and N consecutive CCs starting from the starting carrier number.

In the implementation, the terminal further includes:

indicating, when the CIF field indicates the scheduling carrier, that the DCI does not support simultaneous scheduling of multiple CCs.

In the implementation, before determining N CCs scheduled by a base station through the DCI, the terminal further includes:

determining, when the DCI coincides with a PDCCH candidate of other DCI on the scheduling carrier and a DCI format is the same, that the DCI transmitted on the PDCCH candidate is the DCI for scheduling the N CCs.

In the implementation, when the CIF field includes information used for indicating a combination of N CCs other than the scheduling carrier, the N CCs scheduled by the base station are determined in one of the following ways or a combination thereof:

one of multiple carrier groups is indicated in the CIF field, wherein the multiple carrier groups are pre-configured through higher layer signaling, and each carrier group does not include a scheduling carrier; or, the CIF indicates a starting carrier number of the N carriers scheduled by the DCI, and N consecutive CCs starting from the starting carrier number.

In the implementation, when the CIF indicates the starting carrier number of the N carriers scheduled by the DCI and N consecutive CCs starting from the starting carrier number, N is indicated in one of the following ways or a combination thereof:

N is configured through higher layer signaling; or,

N is determined in a way predefined by a protocol; or,

N is indicated by a newly introduced first information field in the DCI.

In the implementation, when the CIF indicates the starting carrier number of the N carriers scheduled by the DCI, and N consecutive CCs starting from the starting carrier number, the terminal further includes:

newly introducing a second information field, the second information field being used for indicating whether the DCI is used for multi-carrier scheduling.

In the implementation, when determining the N CCs scheduled by the DCI according to a bit field in the DCI used for indicating the N CCs scheduled by the DCI, N is configured through higher layer signaling.

In the implementation, when determining the N CCs scheduled by the DCI according to a bit field in the DCI used for indicating the N CCs scheduled by the DCI, if the CIF field indicates a scheduling carrier, it indicates that the DCI does not support simultaneous scheduling of multiple CCs, wherein the scheduling carrier is a carrier that transmits the DCI.

In the implementation, when determining the N CCs scheduled by the DCI according to an indication of higher layer signaling, before determining, by the terminal, the N CCs scheduled by the base station through the DCI, the terminal further includes:

determining that the DCI configured by higher layer configuration per search space or per CORESET is the DCI for scheduling N CCs.

In the implementation, the terminal further includes:

updating a combination of the N CCs according to MAC CE.

An embodiment of the present disclosure provides a base station, including:

a processor, configured to read a program in a memory, and execute the following processes:

determining N CCs to be scheduled, wherein N is a positive integer greater than or equal to 2;

indicating the N CCs scheduled by the terminal on a DCI;

a transceiver, configured to receive and transmit data under the control of the processor.

In the implementation, indicating the terminal the N CCs scheduled by the base station through the DCI in one of the following ways or a combination thereof:

indicating the N CCs scheduled by the DCI through a CIF field in the DCI; or, indicating the N CCs scheduled by the DCI through a bit field in the DCI used for indicating the N CCs scheduled by the DCI; or, indicating the N CCs scheduled by the DCI through higher layer signaling.

In the implementation, when indicating the N CCs scheduled by the DCI through a CIF field in the DCI, the CIF field includes information used for indicating N CCs including a scheduling carrier; or the CIF field includes information used for indicating a combination of N CCs other than the scheduling carrier, wherein the scheduling carrier is a carrier that transmits the DCI.

In the implementation, when the CIF field includes information used for indicating the N CCs including the scheduling carrier, the N CCs scheduled by the base station are indicated in one of the following ways or a combination thereof:

one of multiple carrier groups is indicated in the CIF field, wherein the multiple carrier groups are pre-configured through higher layer signaling, and each carrier group comprises the scheduling carrier; or, when N=2, the CIF is used for indicating a scheduled carrier other than the scheduling carrier; or, the CIF indicates a starting carrier number of the N carriers scheduled by the DCI, and N consecutive CCs starting from the starting carrier number.

In the implementation, the base station further includes:

indicating, when the CIF field indicates the scheduling carrier, that the DCI does not support simultaneous scheduling of multiple CCs.

In the implementation, the base station further includes:

configuring that the DCI coincides with a physical downlink control channel (PDCCH) candidate of other DCI on the scheduling carrier, and a DCI format is the same, to indicate that the DCI transmitted on the PDCCH candidate is the DCI for scheduling the N CCs.

In the implementation, when the CIF field includes information used for indicating a combination of N CCs other than the scheduling carrier, the N CCs scheduled by the base station are indicated in one of the following ways or a combination thereof:

one of multiple carrier groups is indicated in the CIF field, wherein the multiple carrier groups are pre-configured through higher layer signaling, and each carrier group does not include a scheduling carrier; or, the CIF indicates a starting carrier number of the N carriers scheduled by the DCI, and N consecutive CCs starting from the starting carrier number.

In the implementation, when the CIF indicates the starting carrier number of the N carriers scheduled by the DCI, and N consecutive CCs starting from the starting carrier number, N is indicated in one of the following ways or a combination thereof:

N is configured through higher layer signaling; or,

N is determined in a way predefined by a protocol; or,

N is indicated by a newly introduced first information field in the DCI.

In the implementation, when the CIF indicates the starting carrier number of the N carriers scheduled by the DCI and N consecutive CCs starting from the starting carrier number, further comprising:

newly introducing a second information field, the second information field being used for indicating whether the DCI is used for multi-carrier scheduling.

In the implementation, when indicating the N CCs scheduled by the DCI according to a bit field in the DCI used for indicating the N CCs scheduled by the DCI, N is configured through higher layer signaling.

In the implementation, when indicating the N CCs scheduled by the DCI according to a bit field in the DCI used for indicating the N CCs scheduled by the DCI, the CIF field is configured to indicate the scheduling carrier, in order to indicates that the DCI does not support simultaneous scheduling of multiple CCs, wherein the scheduling carrier is a carrier that transmits the DCI.

In the implementation, when indicating the N CCs scheduled by the DCI through higher layer signaling, the higher layer configuration is configured per search space or per CORESET to indicate that the DCI is the DCI for scheduling N CCs.

In the implementation, the base station further includes:

updating a combination of the N CCs through MAC CE.

An embodiment of the present disclosure provides a carrier determination device, including:

a receiving module, configured to receive DCI, wherein N CCs are scheduled by the DCI, N is a positive integer greater than or equal to 2;

a determination module, configured to determine N CCs scheduled by a base station through the DCI.

An embodiment of the present disclosure provides a carrier indication device, including:

a scheduling module, configured to determine N CCs to be scheduled, wherein N is a positive integer greater than or equal to 2;

an indication module, configured to indicate the N CCs scheduled by the terminal on a DCI.

An embodiment of the present disclosure provides a computer-readable storage medium, wherein the computer-readable storage medium stores a computer program configured to execute the carrier determination method and/or the carrier indication method mentioned above.

The beneficial effects of the present disclosure are as follows:

In the technical solutions provided by the embodiments of the present disclosure, since the base station schedules data transmission on multiple CCs through a DCI, and indicates multiple CCs scheduled through the DCI, correspondingly, after receiving a DCI that schedules data transmission of multiple CCs, the terminal can determine multiple CCs scheduled by the one DCI. Therefore, the flexibility of data scheduling can be improved, and at the same time, excessive DCI overhead can be avoided.

BRIEF DESCRIPTION OF THE DRAWINGS

The accompanying drawings described herein are used to provide further understanding of the present disclosure and constitute a part of the present disclosure. The exemplary embodiments of the present disclosure and their descriptions are used to explain the present disclosure and do not constitute an improper limitation of the present disclosure. The accompanying drawings are described as below.

DETAILED DESCRIPTION

In order to increase scheduling efficiency and save DCI overhead, it may be necessary to consider adopting a DCI transmitted on a scheduling cell to schedule data transmission on multiple scheduled carriers in future communication technologies. The combination of multiple carriers scheduled through a DCI needs to be dynamically changed according to traffic conditions. However, when a DCI is used to schedule data transmission on multiple CCs (Component Carriers), there is currently no clear solution on how to determine the multiple CCs scheduled by the DCI.

Based on this, a carrier indication method is also provided in the embodiments of the present disclosure, and the specific embodiments of the present disclosure will be described below with reference to the accompanying drawings.

In the description process, the implementation of the UE and the base station side will be described respectively, and then an example of the coordinated implementation of the two will be given to better understand the implementation of the solutions given in the embodiments of the present disclosure. This description method does not mean that the two must be implemented together or must be implemented separately. In fact, when the UE and the base station are implemented separately, they also solve the problems on the UE side and the base station side respectively, and when the two are used in combination, better technical results are obtained.

Figure 1:
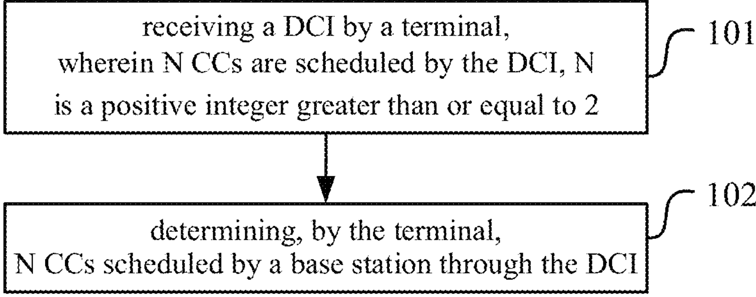
FIG. 1 is a schematic implementation flowchart of a carrier determination method on a terminal side according to an embodiment of the present disclosure.

FIG. 1 is a schematic implementation flowchart of a carrier determination method on the terminal side. As shown in the figure, it may include the following steps.

Step 101, receiving a DCI by a terminal, wherein N CCs are scheduled by the DCI, N is a positive integer greater than or equal to 2.

Step 102, determining, by the terminal, N CCs scheduled by the base station through the DCI.

Correspondingly, an indication method on the base station side is also provided.

Figure 2:
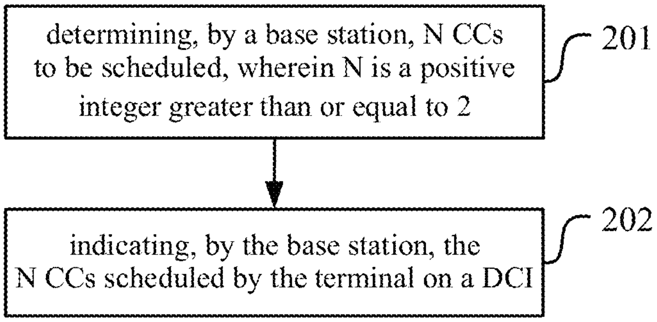
FIG. 2 is a schematic implementation flowchart of a carrier indication method on a network side according to an embodiment of the present disclosure.

FIG. 2 is a schematic flowchart of the implementation of the carrier indication method on the network side. As shown in the figure, it may include the following steps.

Step 201, determining, by a base station, N CCs to be scheduled, wherein N is a positive integer greater than or equal to 2;

Step 202, indicating, by the base station, the N CCs scheduled by the terminal on a DCI.

Specifically, the base station indicates multiple CCs scheduled by a DCI through the information field already included in the current DCI, or through introducing a new information field, or through higher layer signaling, and terminal determines the multiple CCs for data transmissions through analyzing the information field already included in the current DCI, or the newly introduced information field, or higher layer signaling.

A specific description will be given below.

In the implementation, the terminal determines the N CCs scheduled by the base station through the DCI in one of the following ways or a combination thereof:

determining the N CCs scheduled by the DCI according to a CIF field in the DCI; or, determining the N CCs scheduled by the DCI according to a bit field in the DCI used for indicating the N CCs scheduled by the DCI; or, determining the N CCs scheduled by the DCI according to an indication of higher layer signaling.

Correspondingly, in the implementation, the base station indicates the terminal the N CCs scheduled by the base station through the DCI in one of the following ways or a combination thereof:

indicating the N CCs scheduled by the DCI through a CIF field in the DCI; or, indicating the N CCs scheduled by the DCI through a bit field in the DCI used for indicating the N CCs scheduled by the DCI; or, indicating the N CCs scheduled by the DCI through higher layer signaling.

First, the implementation of indicating the N CCs scheduled by the DCI through a CIF field in the DCI.

In the implementation, when indicating the N CCs scheduled by the DCI through a CIF field in the DCI, the CIF field includes information used for indicating N CCs including a scheduling carrier; or the CIF field includes information used for indicating a combination of N CCs other than the scheduling carrier, wherein the scheduling carrier is a carrier that transmits the DCI.

Correspondingly, in the implementation, when the base station indicates the N CCs scheduled by the DCI through the CIF field in the DCI, the CIF field includes information for indicating the N CCs including the scheduled carrier; or, the CIF field includes information for indicating a combination of N CCs other than the scheduling carrier, wherein the scheduling carrier is the carrier that transmits the DCI.

Specifically, the CIF information field included in the scheduling DCI is used for indicating data transmission on N carriers including the scheduling carrier; or, the CIF information field included in the scheduling DCI is used for indicating a combination of N carriers other than the scheduling carrier.

1. Implementation of the information used for indicating N CCs including the scheduling carrier.

In an implementation, when the CIF field contains information for indicating N CCs including scheduling carriers, the N CCs scheduled by the base station are determined in one of the following ways or a combination thereof:

one of multiple carrier groups is indicated in the CIF field, wherein the multiple carrier groups are pre-configured through higher layer signaling, and each carrier group comprises the scheduling carrier; or, when N=2, the CIF is used for indicating a scheduled carrier other than the scheduling carrier; or, the CIF indicates a starting carrier number of the N carriers scheduled by the DCI, and N consecutive CCs starting from the starting carrier number.

Correspondingly, in the implementation, when the CIF field includes information for indicating N CCs including the scheduling carrier, the base station indicates the N CCs scheduled by the base station in one of the following ways or a combination thereof:

one of multiple carrier groups is indicated in the CIF field, wherein the multiple carrier groups are pre-configured through higher layer signaling, and each carrier group comprises the scheduling carrier; or, when N=2, the CIF is used for indicating a scheduled carrier other than the scheduling carrier; or, the CIF indicates a starting carrier number of the N carriers scheduled by the DCI, and N consecutive CCs starting from the starting carrier number.

Specifically, it can be as follows.

1) The combination of the N scheduled carriers is pre-configured through higher layer signaling (for example: RRC signaling; RRC: Radio Resource Control), and the CIF is used for indicating the data transmission on a group of carriers including the scheduling carrier scheduled by the DCI, the scheduling carrier specifically referring to the carrier where the DCI transmission is scheduled.

2) When N=2, the CIF is used for indicating a scheduled carrier other than the scheduling carrier scheduled by the DCI, that is, the DCI indicates the data transmission on the two carriers including the scheduling carrier and a scheduled carrier. For example, when CC #0 is the scheduling carrier, and the scheduled carrier number indicated by the CIF is CC #5, then the DCI schedules data transmission on CC #0 and 3) The CIF indicates the starting carrier number of the multiple carriers scheduled by the DCI, and the DCI schedules data transmission on consecutive N CCs starting from the CC indicated by the CIF.

In the implementation, the terminal may further include:

indicating, when the CIF field indicates the scheduling carrier, that the DCI does not support simultaneous scheduling of multiple CCs.

Correspondingly, in the implementation, the base station may further include:

indicating, when the CIF field indicates the scheduling carrier, that the DCI does not support simultaneous scheduling of multiple CCs.

Specifically, when the CIF field indicates the CC where the DCI transmission is located, it means that the simultaneous scheduling of multiple CCs is not supported at this time.

In the implementation, before the terminal determines the N CCs scheduled by the base station through the DCI, the method further includes:

determining, when the DCI coincides with the PDCCH candidate of other DCI on the scheduling carrier and the DCI formats are the same, that the DCI transmitted on the PDCCH candidate is the DCI for scheduling N CCs.

Correspondingly, in the implementation, the base station may further include:

configuring that the DCI coincides with the PDCCH candidate of other DCI on the scheduling carrier and the DCI format is the same, in order to indicate that the DCI transmitted on the PDCCH candidate is the DCI for scheduling N CCs.

Specifically, when the scheduling DCI for scheduling multiple CCs is completely coincident with the PDCCH candidate of other DCI and the DCI format is the same, the terminal considers that the DCI transmitted on the PDCCH candidate is the DCI for scheduling multiple CCs.

2. Implementation of the information used for indicating the combination of N CCs other than the scheduling carrier.

In the implementation, when the CIF field includes information for indicating the combination of N CCs other than the scheduling carrier, the terminal determines the N CCs scheduled by the base station in one of the following ways or a combination thereof:

one of multiple carrier groups is indicated in the CIF field, wherein the multiple carrier groups are pre-configured through higher layer signaling, and each carrier group does not include a scheduling carrier; or, the CIF indicates a starting carrier number of the N carriers scheduled by the DCI, and N consecutive CCs starting from the starting carrier number.

Correspondingly, in the implementation, when the CIF field includes information for indicating the combination of N CCs other than the scheduling carrier, the base station indicates the N CCs scheduled by the base station in one of the following ways or a combination thereof:

one of multiple carrier groups is indicated in the CIF field, wherein the multiple carrier groups are pre-configured through higher layer signaling, and each carrier group does not include a scheduling carrier; or, the CIF indicates a starting carrier number of the N carriers scheduled by the DCI, and N consecutive CCs starting from the starting carrier number.

Specifically, the CIF information field included in the scheduling DCI is used for indicating the combination of N carriers other than the scheduling carrier.

1) The scheduling DCI is used for indicating data transmission on N scheduled carriers other than the scheduling carrier.

2) The combination of the N scheduled carriers is pre-configured by higher layer signaling, and does not include the scheduling carrier; or the CIF indicates the starting carrier numbers of the multiple carriers scheduled by the DCI, the DCI scheduling data transmission on consecutive N CCs starting from the CC indicated by the CIF.

In the implementation, when the CIF indicates the starting carrier number of the N carriers scheduled by the DCI, and N consecutive CCs starting from the starting carrier number, N is indicated in one of the following ways or a combination thereof:

N is configured through higher layer signaling; or,

N is determined in a way predefined by the protocol; or,

N is indicated by the newly introduced first information field in the DCI.

Correspondingly, in the implementation, when the CIF indicates the starting carrier number of the N carriers scheduled by the DCI, and N consecutive CCs starting from the starting carrier number, the base station indicates the N in one of the following ways or a combination thereof:

N is configured through higher layer signaling; or,

N is indicated in a way predefined by the protocol; or,

N is indicated by the newly introduced first information field in the DCI.

Specifically, the combination of N scheduled carriers is pre-configured through higher layer signaling, and does not include the scheduling carrier; or the CIF indicates the starting carrier number of the multiple carriers scheduled by the one DCI, the DCI scheduling data transmission on consecutive N CCs starting from the CC indicated by the CIF, N is determined as follows:

A. N is configured through higher layer signaling; or,

B. N is determined in a way predefined by the protocol; or,

C. N is indicated by the newly introduced first information field in the DCI.

In the implementation, when the CIF indicates the starting carrier number of the N carriers scheduled by the DCI, and N consecutive CCs starting from the starting carrier number, the terminal further includes:

newly introducing a second information field, the second information field is used for indicating whether the DCI is used for multi-carrier scheduling.

Correspondingly, in the implementation, when the CIF indicates the starting carrier number of the N carriers scheduled by the DCI, and N consecutive CCs starting from the starting carrier number, the base station further includes:

newly introducing a second information field, the second information field is used for indicating whether the DCI is used for multi-carrier scheduling.

Specifically, a second information field may be introduced to indicate whether the DCI is used for multi-carrier scheduling.

Correspondingly, in the implementation, the base station may further include:

updating a combination of N CCs through a MAC CE.

Specifically, the combination of the N scheduled carriers may be updated through a MAC CE (Media Access Control Control Element).

Second, the implementation of indicating the N CCs scheduled by the DCI through the bit field in the DCI used for indicating the N CCs scheduled by the DCI.

In the implementation, when the terminal determines the N CCs scheduled by the DCI according to the bit field in the DCI used for indicating the N CCs scheduled by the DCI, N is configured through higher layer signaling.

Correspondingly, in the implementation, when indicating the N CCs scheduled by the DCI according to the bit field in the DCI used for indicating the N CCs scheduled by the DCI, the base station configures the N through higher layer signaling.

Specifically, a new bit field is defined in the scheduling DCI to indicate N CCs scheduled by the DCI, and the N CCs are pre-configured through higher layer signaling.

The implementation may further include:

updating a combination of N CCs through a MAC CE.

Specifically, the combination of the N scheduled carriers may be updated through the MAC CE.

In the implementation, when the terminal determines the N CCs scheduled by the DCI according to the bit field in the DCI used for indicating the N CCs scheduled by the DCI, if the CIF field indicates the scheduling carrier, it means that the DCI does not support simultaneous scheduling of multiple CCs, wherein the scheduling carrier is the carrier that transmits the DCI.

Correspondingly, in the implementation, when indicating the N CCs scheduled by the DCI according to the bit field in the DCI used for indicating the N CCs scheduled by the DCI, the base station configures the CIF field to indicate the scheduling carrier, to indicate that the DCI does not support simultaneous scheduling of multiple CCs, wherein the scheduling carrier is the carrier that transmits the DCI.

Specifically, when the indication field indicates the CC where the DCI transmission is located, it indicates that the simultaneous scheduling of multiple CCs is not supported at this time.

Third, the implementation of indicating the N CCs scheduled by the DCI through higher layer signaling.

In the implementation, when the terminal determines the N CCs scheduled by the DCI according to the indication of the higher layer signaling, before the terminal determines the N CCs scheduled by the base station through the DCI, the method further includes:

terminal determines that the DCI configured by higher layer configuration per search space or per CORESET is the DCI for scheduling N CCs.

Correspondingly, in the implementation, when the base station indicates the N CCs scheduled by the DCI through higher layer signaling, the higher layer configuration is configured per search space or per CORESET to indicate that the DCI is the DCI for scheduling the N CCs.

Specifically, the N CCs scheduled by the DCI are indicated through higher layer signaling, and further, the higher layer configuration is configured per search space or per CORESET (control resource set), that is, indicating that a DCI transmitted in a specific search space or CORESET is used to schedule data transmission on N CCs.

In the implementation, it may further include:

updating a combination of N CCs through a MAC CE.

Specifically, the combination of the N scheduled carriers may be updated through the MAC CE.

The following is illustrated by examples.

Embodiment 1

The network side device schedules data transmission on multiple CCs through a DCI. The base station indicates data transmission on the N carriers scheduled by the DCI through the CIF field carried in the DCI. After receiving the DCI, the terminal determines to perform data transmission on the N carriers through the CIF field carried in the DCI. In this embodiment. It is assumed that N=2 in this embodiment.

It is assumed that the CIF field in the DCI contains 3 bits. Then the CIF field is used for indicating other carriers that are simultaneously scheduled by the DCI in addition to scheduling data transmissions on this carrier. For example, a DCI used for scheduling data transmission on multiple CCs is transmitted in the search space determined by nCI. At this time, nCI=0, then the CIF field is a non-zero value, which is used for indicating a carrier in the carrier set configured by the base station for cross-carrier scheduling.

For example, the CIF field contains 3 bits of information, and the cross-carrier scheduling CCs configured by the base station for the terminal are {CC #0, CC #5, CC #6, CC #13, CC #15, CC #19, CC #23, CC #26}, and CC #0 is the scheduling carrier. The set of scheduled carriers indicated by the CIF field at this time is shown in the following table. That is, the current RRC configuration signaling can be reused at this time, and there is no need to introduce new RRC parameters to configure scheduled carriers other than the scheduled carrier.

| CIF | CC combination scheduled by the DCI |
|---|---|
| 000 | Indicates the carrier of the DCI, which is single-carrier scheduling at this time |
| 001 | CC#0&CC#5 |
| 010 | CC#0&CC#6 |
| 011 | CC#0&CC#13 |
| 100 | CC#0&CC#15 |
| 101 | CC#0&CC#19 |
| 110 | CC#0&CC#23 |
| 111 | CC#0&CC#26 |

When the scheduling DCI used for scheduling multiple CCs completely coincides with the PDCCH candidate other scheduling DCI on the scheduling carrier, and the DCI formats are the same, the terminal considers that the DCI transmitted on the PDCCH candidate is the DCI for scheduling multiple CCs.

Further, the base station may update the combination of the N scheduled carriers through the MAC CE.

Embodiment 2

The network side device schedules data transmission on multiple CCs through a DCI. The base station indicates data transmission on the N carriers scheduled by the DCI through the CIF field carried in the DCI. After receiving the DCI, the terminal determines to perform data transmission on the N carriers through the CIF field carried in the DCI. In this embodiment, it is assumed that N=3, that is, the DCI schedules data transmission on the other two carriers other than the scheduling carrier.

It is assumed that the CIF field in the DCI contains 3 bits. Then, the CIF field is used for indicating that the DCI schedules data transmission on the current carrier and other two carriers simultaneously scheduled by the DCI. The combination of the two carriers is configured in advance through higher layer signaling (RRC signaling), for example, the following correspondence is configured through higher layer signaling. Of course, the following table is only a specific example, and this embodiment does not make any limitation on the carrier group.

| CIF | The DCI-scheduled CC combination |
|---|---|
| 000 | Indicates the carrier of the DCI, which is single-carrier scheduling at this time |
| 001 | CC#0&{CC#5, CC#6} |
| 010 | CC#0&{CC#6, CC#7} |
| 011 | CC#0&{CC#13, CC#14} |
| 100 | CC#0&{CC#15, CC#5} |
| 101 | CC#0&{CC#19, CC#6} |
| 110 | CC#0&{CC#23, CC#7} |
| 111 | CC#0&{CC#26, CC#1} |

When a scheduling DCI used for scheduling multiple CCs completely coincides with the PDCCH candidates scheduling other scheduling DCI on the scheduling carrier, and the DCI formats are the same, the terminal considers that the DCI transmitted on the PDCCH candidate is the DCI used for scheduling multiple CCs.

Further, the base station may update the combination of the N scheduled carriers through the MAC CE.

Embodiment 3

The network side device schedules data transmission on multiple CCs through a DCI. The base station indicates the data transmission on the N carriers scheduled by the DCI through the CIF field carried in the DCI. After receiving the DCI, the terminal determines the starting carrier number of the N carriers through the CIF field carried in the DCI. The DCI schedules data transmission on consecutive N CCs starting from the CC indicated by the CIF. Wherein N can be determined as follows:

N is configured through higher layer signaling, and when the higher layer configuration is default, it means that the DCI can only schedule data transmission on a single carrier;

or, N is determined in a way predefined by the protocol, for example, N=2;

or, N is indicated by a newly introduced information bit in the DCI, for example, the number of 2M types of consecutive carriers preconfigured by higher layer signaling is indicated by the information field of M bits, or the number of consecutive carriers is any number between 1 and 2M.

Embodiment 4

As in Embodiments 2-3, the scheduling DCI indicates data transmission on N scheduled carriers other than the scheduling carrier through the CIF field. The combination of the N scheduled carriers is pre-configured through higher layer signaling, and does not include the scheduling carrier.

Embodiment 5

The network side device schedules data transmission on multiple CCs through a DCI. A new carrier group indication field is introduced into the DCI to indicate the combination of N CCs scheduled by the DCI. The specific manner is similar to that of Embodiments 1-4, which are not repeated here.

Embodiment 6

The network side device schedules data transmission on multiple CCs through a DCI. The base station indicates the combination of multiple CCs scheduled by the DCI through higher layer signaling. The combination of the multiple CCs may be:

CC combinations including the scheduling carrier;

or, a CC combination that does not include the scheduling carrier.

There are no restrictions on specific combinations in the implementation. Specifically, it is assumed that the combination of multiple CCs configured by higher layer signaling is ICC #0, CC #11 or {CC #1}, and if CC #0 is the scheduling carrier, it means that the DCI simultaneously schedules data transmission on CC #0 and CC #1. Of course, there is no limitation on the specific number of CCs in the implementation.

Further, the higher layer configuration is configured per search space or a per CORESET, that is, a DCI transmitted in a specific search space or CORESET is indicated to be used for scheduling data transmission on the multiple CCs.

Further, the combination of the multiple scheduled carriers can be updated through MAC CE.

Based on the same inventive concept, an embodiment of the present disclosure further provides a base station, a user terminal, a carrier determination device, a carrier indication device, and a computer-readable storage medium. Since the principles of these devices for solving problems are similar to the carrier determination method and the carrier indication method, the implementation of these devices can refer to the implementation of the method, which will not be repeated herein.

When implementing the technical solutions provided by the embodiments of the present disclosure, it can be implemented as follows.

Figure 3:
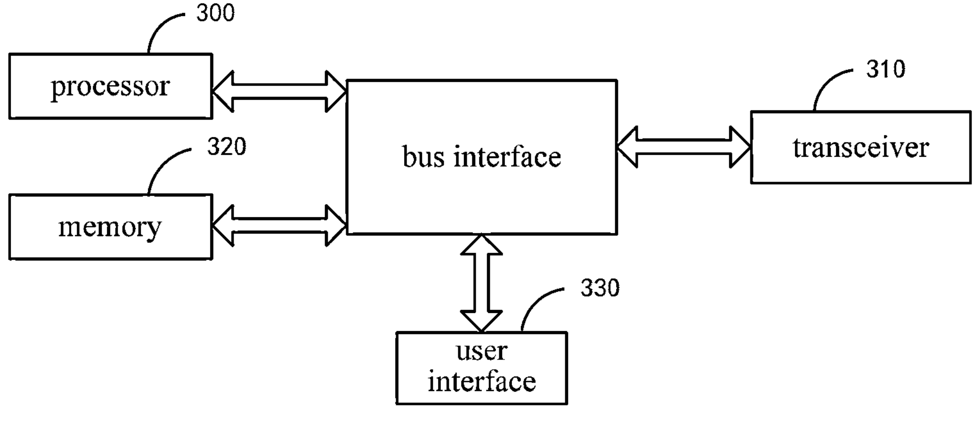
FIG. 3 is a schematic structural diagram of a user terminal according to an embodiment of the present disclosure.

FIG. 3 is a schematic structural diagram of a user terminal. As shown in the figure, the user terminal includes:

a processor 300, configured to read a program in a memory 320, and execute the following processes:

receiving DCI, wherein N CCs are scheduled by the DCI, N is a positive integer greater than or equal to 2;

determining the N CCs scheduled by the base station through the DCI;

a transceiver 310, configured to receive and transmit data under the control of the processor 300.

In the implementation, the N CCs scheduled by the base station are determined through DCI in one of the following ways or a combination thereof:

determining the N CCs scheduled by the DCI according to the CIF field in the DCI; or, determining the N CCs scheduled by the DCI according to the bit field in the DCI used for indicating the N CCs scheduled by the DCI; or, determining the N CCs scheduled by the DCI according to the indication of the higher layer signaling.

In the implementation, when determining the N CCs scheduled by the DCI according to the CIF field in the DCI, the CIF field comprises information used for indicating N CCs comprising a scheduling carrier; or the CIF field comprises information used for indicating a combination of N CCs other than the scheduling carrier, wherein the scheduling carrier is a carrier that transmits the DCI.

In the implementation, when the CIF field includes the information used for indicating the N CCs comprising the scheduling carrier, the N CCs scheduled by the base station are determined in one of the following ways or a combination thereof:

one of multiple carrier groups is indicated in the CIF field, wherein the multiple carrier groups are pre-configured through higher layer signaling, and each carrier group comprises the scheduling carrier; or, when N=2, the CIF is used for indicating a scheduled carrier other than the scheduling carrier; or, the CIF indicates a starting carrier number of the N carriers scheduled by the DCI, and N consecutive CCs starting from the starting carrier number.

The implementation further includes:

indicating, when the CIF field indicates the scheduling carrier, that the DCI does not support simultaneous scheduling of multiple CCs.

In the implementation, before the N CCs scheduled by the base station are determined by the DCI, the method further includes:

determining, when the DCI coincides with a physical downlink control channel (PDCCH) candidate of other DCI on the scheduling carrier, and a DCI format is the same, that the DCI transmitted on the PDCCH candidate is the DCI for scheduling the N CCs.

In the implementation, when the CIF field includes information used for indicating a combination of N CCs other than the scheduling carrier, the N CCs scheduled by the base station are determined in one of the following ways or a combination thereof:

one of multiple carrier groups is indicated in the CIF field, wherein the multiple carrier groups are pre-configured through higher layer signaling, and each carrier group does not include a scheduling carrier; or, the CIF indicates a starting carrier number of the N carriers scheduled by the DCI, and N consecutive CCs starting from the starting carrier number.

In the implementation, when the CIF indicates the starting carrier number of the N carriers scheduled by the DCI, and N consecutive CCs starting from the starting carrier number, N is indicated in one of the following ways or a combination thereof:

N is configured through higher layer signaling; or,

N is determined in a way predefined by a protocol; or,

N is indicated by a newly introduced first information field in the DCI.

In the implementation, when the CIF indicates the starting carrier number of the N carriers scheduled by the DCI and N consecutive CCs starting from the starting carrier number, the method further includes:

newly introducing a second information field, the second information field being used for indicating whether the DCI is used for multi-carrier scheduling.

In the implementation, when determining the N CCs scheduled by the DCI according to a bit field in the DCI used for indicating the N CCs scheduled by the DCI, N is configured through higher layer signaling.

In the implementation, when determining the N CCs scheduled by the DCI according to a bit field in the DCI used for indicating the N CCs scheduled by the DCI, if the CIF field indicates a scheduling carrier, it indicates that the DCI does not support simultaneous scheduling of multiple CCs, wherein the scheduling carrier is a carrier that transmits the DCI.

In the implementation, when determining the N CCs scheduled by the DCI according to an indication of higher layer signaling, before determining, by the terminal, the N CCs scheduled by the base station through the DCI, the method further includes:

determining that the DCI configured by higher layer configuration per search space or per CORESET is the DCI for scheduling N CCs.

In the implementation, the method further includes:

updating a combination of the N CCs according to MAC CE.

Among them, in FIG. 3, the bus architecture may include any number of interconnected buses and bridges, specifically various circuits such as one or more processors represented by the processor 300 and the memory represented by the memory 320 are connected together. The bus architecture can also connect various other circuits such as peripheral devices, voltage regulators, power management circuits, etc., which are all known in the field, and therefore, will not be further described herein. The bus interface provides the interface. The transceiver 310 may be a plurality of elements, that is, including a transmitter and a receiver, and provide a unit for communicating with various other devices on the transmission medium. For different terminals, the user interface 330 may also be an interface capable of connecting externally or internally to required equipment. The connected equipment includes, but is not limited to, a keypad, a display, a speaker, a microphone, a joystick, etc.

The processor 300 is responsible for managing the bus architecture and general processing, and the memory 320 can store data used by the processor 300 when performing operations.

An embodiment of the present disclosure provides a carrier determination device, including:

a receiving module, configured to receive DCI, wherein N CCs are scheduled by the DCI, N is a positive integer greater than or equal to 2;

a determining module, configured to determine the N CCs scheduled by the base station through the DCI.

For specific implementation, may refer to the implementation of the carrier determination method.

For the convenience of description, each part of the device described above is divided into various modules or units by function and described respectively. Of course, when implementing the present disclosure, the functions of each module or unit may be implemented in one or more software or hardware.

Figure 4:
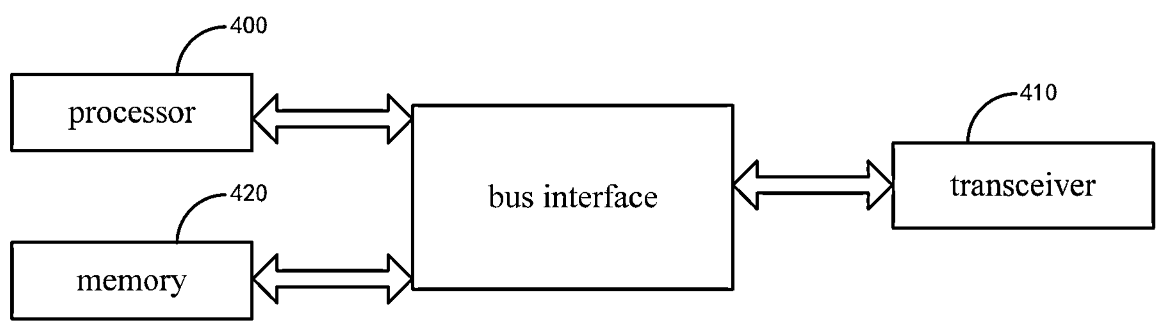
FIG. 4 is a schematic structural diagram of a base station according to an embodiment of the present disclosure.

FIG. 4 is a schematic structural diagram of the base station. As shown in the figure, the base station includes:

a processor 400, configured to read a program in a memory 420, and execute the following processes:

determining N CCs to be scheduled, wherein N is a positive integer greater than or equal to 2;

indicating the N CCs scheduled by the terminal on a DCI;

a transceiver 410, configured to receive and transmit data under the control of the processor.

In the implementation, indicating the terminal the N CCs scheduled by the base station through the DCI in one of the following ways or a combination thereof:

indicating the N CCs scheduled by the DCI through a CIF field in the DCI; or, indicating the N CCs scheduled by the DCI through a bit field in the DCI used for indicating the N CCs scheduled by the DCI; or, indicating the N CCs scheduled by the DCI through higher layer signaling.

In the implementation, when indicating the N CCs scheduled by the DCI through a CIF field in the DCI, the CIF field includes information used for indicating N CCs including a scheduling carrier; or the CIF field includes information used for indicating a combination of N CCs other than the scheduling carrier, wherein the scheduling carrier is a carrier that transmits the DCI.

In the implementation, when the CIF field includes information used for indicating the N CCs including the scheduling carrier, the N CCs scheduled by the base station are indicated in one of the following ways or a combination thereof:

one of multiple carrier groups is indicated in the CIF field, wherein the multiple carrier groups are pre-configured through higher layer signaling, and each carrier group comprises the scheduling carrier; or, when N=2, the CIF is used for indicating a scheduled carrier other than the scheduling carrier; or, the CIF indicates a starting carrier number of the N carriers scheduled by the DCI, and N consecutive CCs starting from the starting carrier number.

In the implementation, the base station further includes:

when the CIF field indicates the scheduling carrier, it indicates that the DCI does not support simultaneous scheduling of multiple CCs.

In the implementation, the base station further includes:

configuring that the DCI coincides with a physical downlink control channel (PDCCH) candidate of other DCI on the scheduling carrier, and a DCI format is the same, to indicate that the DCI transmitted on the PDCCH candidate is the DCI for scheduling the N CCs.

In the implementation, when the CIF field includes information used for indicating a combination of N CCs other than the scheduling carrier, the N CCs scheduled by the base station are indicated in one of the following ways or a combination thereof:

one of multiple carrier groups is indicated in the CIF field, wherein the multiple carrier groups are pre-configured through higher layer signaling, and each carrier group does not include a scheduling carrier; or, the CIF indicates a starting carrier number of the N carriers scheduled by the DCI, and N consecutive CCs starting from the starting carrier number.

In the implementation, when the CIF indicates the starting carrier number of the N carriers scheduled by the DCI, and N consecutive CCs starting from the starting carrier number, N is indicated in one of the following ways or a combination thereof:

N is configured through higher layer signaling; or,

N is determined in a way predefined by a protocol; or,

N is indicated by a newly introduced first information field in the DCI.

In the implementation, when the CIF indicates the starting carrier number of the N carriers scheduled by the DCI and N consecutive CCs starting from the starting carrier number, further comprising:

newly introducing a second information field, the second information field being used for indicating whether the DCI is used for multi-carrier scheduling.

In the implementation, when indicating the N CCs scheduled by the DCI according to a bit field in the DCI used for indicating the N CCs scheduled by the DCI, N is configured through higher layer signaling.

In the implementation, when indicating the N CCs scheduled by the DCI according to a bit field in the DCI used for indicating the N CCs scheduled by the DCI, the CIF field is configured to indicate the scheduling carrier, in order to indicates that the DCI does not support simultaneous scheduling of multiple CCs, wherein the scheduling carrier is a carrier that transmits the DCI.

In the implementation, when indicating the N CCs scheduled by the DCI through higher layer signaling, the higher layer configuration is configured per search space or per CORESET to indicate the DCI is the DCI for scheduling N CCs.

In the implementation, the base station further includes:

updating a combination of the N CCs through MAC CE.

Among them, in FIG. 4, the bus architecture may include any number of interconnected buses and bridges, specifically various circuits such as one or more processors represented by the processor 400 and the memory represented by the memory 420 are connected together. The bus architecture can also connect various other circuits such as peripheral devices, voltage regulators, power management circuits, etc., which are all known in the field, and therefore, will not be further described herein. The bus interface provides the interface. The transceiver 410 may be a plurality of elements, that is, including a transmitter and a receiver, and provide a unit for communicating with various other devices on the transmission medium. The processor 400 is responsible for managing the bus architecture and general processing, and the memory 420 can store data used by the processor 400 when performing operations.

An embodiment of the present disclosure provides a carrier indication device, including:

a scheduling module, configured to determine N CCs to be scheduled, wherein N is a positive integer greater than or equal to 2;

an indication module, configured to indicate the N CCs scheduled by the terminal on a DCI.

For specific implementation, may refer to the implementation of the carrier indication method.

For the convenience of description, each part of the above apparatus is divided into various modules or units by function and described respectively. Of course, when implementing the present disclosure, the functions of each module or unit may be implemented in one or more software or hardware.

An embodiment of the present disclosure provides a computer-readable storage medium, wherein the computer-readable storage medium stores a computer program configured to execute the carrier determination method and/or the carrier indication method mentioned above.

For specific implementation, may refer to the implementation of the carrier determination method and/or the carrier indication method.

To sum up, in the technical solutions provided by the embodiments of the present disclosure, the base station schedules data transmission on multiple CCs through a DCI, and indicates the multiple CCs scheduled by the DCI through the CIF field or the newly defined information field or the RRC parameter.

The terminal receives the DCI that schedules data transmission of multiple CCs, and determines the multiple CCs scheduled by the DCI through the CIF field or the newly defined information field or the RRC parameter.

The solution for indicating multiple scheduled carriers provided in the embodiments of the present disclosure can improve the flexibility of data scheduling while avoiding excessive DCI overhead.

A person skilled in the art can understand that embodiments of the present disclosure may be provided as a method, system, or computer program product. Accordingly, the present disclosure may take the form of an entirely hardware embodiment, an entirely software embodiment, or an embodiment combining software and hardware aspects. Furthermore, the present disclosure may take the form of a computer program product configured to be executed on one or more computer-usable storage mediums storing computer-usable program code therein (including but not limited to disk storage, optical storage, etc.).

The present disclosure is described with reference to flowcharts and/or block diagrams of methods, apparatus (systems), and computer program products according to the embodiments of the disclosure. It will be understood that each process and/or block in the flowcharts and/or block diagrams, and combinations of processes and/or blocks in the flowcharts and/or block diagrams, can be implemented by computer program instructions. These computer program instructions may be provided to the processor of a general-purpose computer, special purpose computer, embedded processor or other programmable data processing device to produce a machine such that the instructions executed by the processor of the computer or other programmable data processing device produce an apparatus for implementing the functions specified in one or more processes in the flowcharts and/or one or more blocks in the block diagrams.

These computer program instructions may also be stored in a computer readable memory capable of directing a computer or other programmable data processing device to operate in a particular manner, such that the instructions stored in the computer readable memory produce an article of manufacture including an instruction device that implements the functions specified in one or more processes in a flowchart and/or one or more blocks in a block diagram.

These computer program instructions may also be loaded onto a computer or other programmable data processing device such that a series of operational steps are executed on the computer or other programmable device to produce computer-implemented processing, so that the instructions executed on the computer or other programmable device provide steps for implementing the functions specified in in one or more processes in a flowchart and/or one or more blocks in a block diagram.

It should be noted that the above division of various modules of network devices and terminals is only a logical division of functions, which can be fully or partially integrated into a physical entity or physically separated when implemented in practice. These modules can be implemented in the form of software calls through processing elements, or in the form of hardware calls, or in the form of software calls through processing elements for some modules and hardware calls for some modules. For example, the determination module can be a separate processing element or can be integrated in one of the chips of the above-mentioned device, or it can be stored in the memory of the above-mentioned device in the form of program code, which is called by one of the processing elements of the above-mentioned device and performs the functions of the above-mentioned determination module. Other modules can be implemented similarly. In addition, these modules can be integrated in whole or in part or can be implemented independently. The processing element described here can be an integrated circuit with signal processing capabilities. In the implementation, the steps of the method described above, or the individual modules above can be accomplished by integrated logic circuits in the hardware of the processor element or by instructions in the form of software.

For example, each module, unit, subunit, or submodule may be one or more integrated circuits configured to implement the above method, such as: one or more Application Specific Integrated Circuits (ASICs), or one or more digital signal processors (DSPs), or one or more Field Programmable Gate Array (FPGA), etc. Further, when one of the above modules is implemented in the form of a processing element that dispatches program code, the processing element may be a general-purpose processor, such as a Central Processing Unit (CPU) or other processor that can call program code. Alternatively, these modules may be integrated together and implemented in the form of a system-on-a-chip (SOC).

The terms "first," "second," etc. in the description and claims of the present disclosure are used to distinguish similar objects and are not necessarily used to describe a specific order or sequence. It should be understood that the data so used may be interchanged under appropriate circumstances so that the embodiments of the application described herein, such as those illustrated or described herein, are implemented in sequences other than those illustrated or described herein. Furthermore, the terms "comprising" and "having", and any variations thereof, are intended to cover non-exclusive inclusion, for example, a process, method, system, product or device comprising a series of steps or units is not necessarily limited to those steps or units clearly listed, but may include those not clearly listed. The terms may include other steps or units not clearly listed or inherent to those processes, methods, products, or devices. In addition, the specification and claims use "and/or" to denote at least one of the connected objects, e.g., A and/or B and/or C, to indicate the seven cases comprising A alone, B alone, C alone, and A and B both, B and C both, A and C both, and A, B, and C all. Similarly, the use of "at least one of A and B" in this specification and in the claims is to be understood as "A alone, B alone, or A and B both".

The above are optional implementations of the present disclosure. It should be pointed out that for a person skilled in the art, several improvements and modifications can be made without departing from the principles of the present disclosure. These improvements and modifications should also fall within the protection scope of the present disclosure.

What is claimed is:

1. A carrier determination method, comprising:

receiving, by a terminal, a downlink control information (DCI), wherein N component carriers (CCs) are scheduled by the DCI, N is a positive integer greater than or equal to 2;

determining, by the terminal, N CCs scheduled by a base station through the DCI;

wherein the terminal determines the N CCs scheduled by the base station through the DCI as follows:

determining the N CCs scheduled by the DCI according to a carrier indicator field (CIF) in the DCI; or, determining the N CCs scheduled by the DCI according to a bit field in the DCI used for indicating the N CCs scheduled by the DCI;

wherein N is configured through higher layer signaling; or, determining the N CCs scheduled by the DCI according to an indication of higher layer signaling;

wherein when determining the N CCs scheduled by the DCI according to the CIF field in the DCI, the CIF field comprises information used for indicating N CCs comprising a scheduling carrier, wherein the N CCs scheduled by the base station are determined as follows:

one of multiple carrier groups is indicated in the CIF field, wherein the multiple carrier groups are pre-configured through higher layer signaling, and each carrier group comprises the scheduling carrier;

or, the CIF field comprises information used for indicating a combination of N CCs other than the scheduling carrier, the scheduling carrier is a carrier that transmits the DCI, wherein the N CCs scheduled by the base station are determined as follows:

one of multiple carrier groups is indicated in the CIF field, wherein the multiple carrier groups are pre-configured through higher layer signaling, and each carrier group does not comprise a scheduling carrier.

2. The method according to claim 1, prior to the determining, by the terminal, N CCs scheduled by a base station through the DCI, further comprising:

determining, when the DCI coincides with a physical downlink control channel (PDCCH) candidate of other DCI on the scheduling carrier, and a DCI format is the same, that the DCI transmitted on the PDCCH candidate is the DCI for scheduling the N CCs.

3. The method according to claim 1, wherein, when determining the N CCs scheduled by the DCI according to an indication of higher layer signaling, before determining, by the terminal, the N CCs scheduled by the base station through the DCI, the method further comprises:

determining, by the terminal, that the DCI configured by higher layer configuration per search space or per CORESET is the DCI for scheduling N CCs.

4. The method according to claim 1, further comprising:

updating a combination of the N CCs according to medium access control control element (MAC CE).

5. A carrier indication method, comprising:

determining, by a base station, N component carriers (CCs) to be scheduled, wherein Nis a positive integer greater than or equal to 2;

indicating, by the base station, the N CCs scheduled by the terminal on a DCI;

wherein the base station indicates the terminal the N CCs scheduled by the base station through the DCI as follows:

indicating the N CCs scheduled by the DCI through a CIF field in the DCI; or, indicating the N CCs scheduled by the DCI through a bit field in the DCI used for indicating the N CCs scheduled by the DCI;

wherein N is configured through higher layer signaling; or, indicating the N CCs scheduled by the DCI through higher layer signaling;

wherein, when indicating the N CCs scheduled by the DCI through a CIF field in the DCI, the CIF field comprises information used for indicating N CCs comprising a scheduling carrier, wherein the N CCs scheduled by the base station are indicated as follows:

one of multiple carrier groups is indicated in the CIF field, wherein the multiple carrier groups are pre-configured through higher layer signaling, and each carrier group comprises the scheduling carrier;

or, the CIF field comprises information used for indicating a combination of N CCs other than the scheduling carrier, wherein the scheduling carrier is a carrier that transmits the DCI, wherein the N CCs scheduled by the base station are indicated as follows:

one of multiple carrier groups is indicated in the CIF field, wherein the multiple carrier groups are pre-configured through higher layer signaling, and each carrier group does not comprise a scheduling carrier.

6. The method according to claim 5, further comprising:

configuring that the DCI coincides with a physical downlink control channel (PDCCH) candidate of other DCI on the scheduling carrier, and a DCI format is the same, to indicate that the DCI transmitted on the PDCCH candidate is the DCI for scheduling the N CCs.

7. The method according to claim 5, wherein, when indicating the N CCs scheduled by the DCI through higher layer signaling, the higher layer configuration is configured per search space or per CORESET to indicate that the DCI is the DCI for scheduling N CCs.

8. The method according to claim 5, further comprising:

updating a combination of the N CCs through MAC CE.

9. A user terminal, comprising:

a processor, configured to read a program in a memory, and execute the following processes:

receiving DCI, wherein N component carriers (CCs) are scheduled by the DCI, N is a positive integer greater than or equal to 2;

determining N CCs scheduled by a base station through the DCI;

a transceiver, configured to receive and transmit data under the control of the processor;

wherein, the N CCs scheduled by the base station are determined through DCI as follows:

determining the N CCs scheduled by the DCI according to a CIF field in the DCI; or, determining the N CCs scheduled by the DCI according to a bit field in the DCI used for indicating the N CCs scheduled by the DCI;

wherein N is configured through higher layer signaling; or, determining the N CCs scheduled by the DCI according to an indication of higher layer signaling;

wherein, when determining the N CCs scheduled by the DCI according to the CIF field in the DCI, the CIF field comprises information used for indicating N CCs comprising a scheduling carrier, wherein the N CCs scheduled by the base station are determined as follows:

one of multiple carrier groups is indicated in the CIF field, wherein the multiple carrier groups are pre-configured through higher layer signaling, and each carrier group comprises the scheduling carrier;

or, the CIF field comprises information used for indicating a combination of N CCs other than the scheduling carrier, wherein the scheduling carrier is a carrier that transmits the DCI, wherein the N CCs scheduled by the base station are determined as follows:

one of multiple carrier groups is indicated in the CIF field, wherein the multiple carrier groups are pre-configured through higher layer signaling, and each carrier group does not comprise a scheduling carrier.

10. The terminal according to claim 9, prior to determining N CCs scheduled by a base station through the DCI, further comprising:

determining, when the DCI coincides with a PDCCH candidate of other DCI on the scheduling carrier and a DCI format is the same, that the DCI transmitted on the PDCCH candidate is the DCI for scheduling the N CCs.

11. The terminal according to claim 9, wherein, when determining the N CCs scheduled by the DCI according to an indication of higher layer signaling, before determining, by the terminal, the N CCs scheduled by the base station through the DCI, further comprising:

determining that the DCI configured by higher layer configuration per search space or per CORESET is the DCI for scheduling N CCs.

12. The terminal according to claim 9, further comprising:

updating a combination of the N CCs according to MAC CE.

13. A base station, comprising:

a processor, configured to read a program in a memory, and execute the carrier indication method according to claim 5;

a transceiver, configured to receive and transmit data under the control of the processor.

14. The base station according to claim 13, wherein, when indicating the N CCs scheduled by the DCI through a CIF field in the DCI, the CIF field comprises information used for indicating N CCs comprising a scheduling carrier, wherein the N CCs scheduled by the base station are indicated as follows:

one of multiple carrier groups is indicated in the CIF field, wherein the multiple carrier groups are pre-configured through higher layer signaling, and each carrier group comprises the scheduling carrier;

or, the CIF field comprises information used for indicating a combination of N CCs other than the scheduling carrier, wherein the scheduling carrier is a carrier that transmits the DCI, wherein the N CCs scheduled by the base station are indicated as follows:

one of multiple carrier groups is indicated in the CIF field, wherein the multiple carrier groups are pre-configured through higher layer signaling, and each carrier group does not comprise a scheduling carrier.

15. The base station according to claim 13, further comprising:

configuring that the DCI coincides with a physical downlink control channel (PDCCH) candidate of other DCI on the scheduling carrier, and a DCI format is the same, to indicate that the DCI transmitted on the PDCCH candidate is the DCI for scheduling the N CCs.

16. The base station according to claim 13, wherein, when indicating the N CCs scheduled by the DCI through higher layer signaling, the higher layer configuration is configured per search space or per CORESET to indicate that the DCI is the DCI for scheduling N CCs.

17. The base station according to claim 13, further comprising:

updating a combination of the N CCs through MAC CE.

* * * * *